(12) United States Patent
Kojima (10) Patent No.: US 12,203,522 B2
(45) Date of Patent: Jan. 21, 2025

(54) VIBRATION-DAMPING DEVICE (71) Applicant: Prospira Corporation, Kawasaki (JP)

(72) Inventor: Hiroshi Kojima, Tokyo (JP)

(73) Assignee: Prospira Corporation, Kawasaki (JP)

( * ) Notice: Subject to any disclaimer, the term of this patent is extended or adjusted under 35 U.S.C. 154(b) by 231 days.

(21) Appl. No.: 17/642,862

(22) PCT Filed: Jun. 18, 2020

(86) PCT No.: PCT/JP2020/023954
§ 371 (c)(1),
(2) Date: Mar. 14, 2022

(87) PCT Pub. No.: WO2021/053905
PCT Pub. Date: Mar. 25, 2021

(65) Prior Publication Data
US 2022/0389986 A1 Dec. 8, 2022

(30) Foreign Application Priority Data
Sep. 17, 2019 (JP) .................. 2019-168413

(51) Int. Cl.
*F16F 13/10* (2006.01)
*F16F 13/26* (2006.01)

(52) U.S. Cl.
CPC .......... *F16F 13/107* (2013.01); *F16F 13/108* (2013.01); *F16F 13/264* (2013.01); *F16F 2222/04* (2013.01); *F16F 2222/12* (2013.01)

(58) Field of Classification Search
CPC ................ F16F 13/16; F16F 13/085
See application file for complete search history.

(56) References Cited

U.S. PATENT DOCUMENTS 7,040,607 B2   5/2006  Grassmuck
8,876,093 B2  11/2014  Kubo et al.
(Continued)

FOREIGN PATENT DOCUMENTS

CN   101883932 A   11/2010
CN   102472354 A    5/2012
(Continued)

OTHER PUBLICATIONS

International Search Report for PCT/JP2020/023954, dated Aug. 25, 2020.
(Continued)

*Primary Examiner* — Melody M Burch
(74) *Attorney, Agent, or Firm* — KENJA IP LAW PC (57) ABSTRACT

A vibration-damping device includes a first attachment member (11), a second attachment member (12), an elastic body (13), and a partition member (17), the partition member including a membrane (31) and an orifice (20). The orifice (20) includes a first communication hole (21), a second communication hole (22), an intermediate chamber (35), a restriction passage (23), and a communication hole (24), the restriction passage includes a main liquid chamber-side passage (25) and an auxiliary liquid chamber-side passage (26), the main liquid chamber-side passage and the auxiliary liquid chamber-side passage extend in a circumferential direction and are disposed to be connected to each other in a radial direction, and when the liquid flows through the restriction passage from any one of the first communication hole and the second communication hole toward the other, the flow direction in the main liquid chamber-side passage and the flow direction in the auxiliary liquid chamber-side passage are opposite to each other.

2 Claims, 4 Drawing Sheets

(56) References Cited

U.S. PATENT DOCUMENTS

| | | |
|---|---|---|
| 8,960,654 B2 | 2/2015 | Kojima et al. |
| 9,365,101 B2 | 6/2016 | Okumura |
| 10,989,269 B2 | 4/2021 | Kojima |
| 11,428,290 B2 | 8/2022 | Ueki et al. |
| 2007/0085249 A1 | 4/2007 | Happou et al. |
| 2012/0299229 A1 | 11/2012 | Kubo et al. |
| 2013/0175745 A1* | 7/2013 | Kojima .................. F16F 13/08 267/140.13 |
| 2016/0003322 A1* | 1/2016 | Bradshaw ............ B60K 5/1208 267/140.13 |
| 2016/0160956 A1 | 6/2016 | Ueki |
| 2018/0238416 A1 | 8/2018 | Brown et al. |
| 2019/0226549 A1 | 7/2019 | Kojima |
| 2020/0232534 A1 | 7/2020 | Kojima |

FOREIGN PATENT DOCUMENTS

| | | | |
|---|---|---|---|
| CN | 102770686 A | 11/2012 | |
| CN | 108980261 A | 12/2018 | |
| CN | 109690127 A | 4/2019 | |
| EP | 0312719 A1 | 4/1989 | |
| EP | 2221503 A1 * | 8/2010 | ............ F16F 13/106 |
| FR | 2872879 A1 | 1/2006 | |
| JP | 01-153832 A | 6/1989 | |
| JP | H10132017 A | 5/1998 | |
| JP | 2004-190721 A | 7/2004 | |
| JP | 2006-258215 A | 9/2006 | |
| JP | 2008019955 A | 1/2008 | |
| JP | 2010-151256 A | 7/2010 | |
| JP | 2015145701 A | 8/2015 | |
| JP | 2017044220 A | 3/2017 | |
| JP | 2019027471 A | 2/2019 | |
| JP | 2019-070430 A | 5/2019 | |
| JP | 2019086103 A * | 6/2019 | ........... B60K 5/1208 |
| WO | 2005106283 A1 | 11/2005 | |
| WO | 2018003131 A1 | 1/2018 | |
| WO | 2018/051627 A1 | 3/2018 | |
| WO | 2019074069 A1 | 4/2019 | |
| WO | 2019131043 A1 | 7/2019 | |

OTHER PUBLICATIONS

Sep. 7, 2023, search result of the Extended European Search Report issued by the European Patent Office in the corresponding European Patent Application No. 20866193.4.

Apr. 12, 2024, search result of Office Action issued by the China National Intellectual Property Administration in the corresponding Chinese Patent Application No. 202080064667.1.

* cited by examiner

VIBRATION-DAMPING DEVICE

TECHNICAL FIELD

This application is a National Stage of International Application No. PCT/JP2020/023954 filed Jun. 18, 2020, claiming priority based on Japanese Patent Application No. 2019-168413 filed Sep. 17, 2019, the content of which is incorporated herein by reference.

BACKGROUND ART

A vibration-damping device, as shown in the following Patent Document 1, including a tubular first attachment member that is connected to any one of a vibration generating part and a vibration receiving part, a second attachment member that is connected to the other thereof, an elastic body that connects the first attachment member and the second attachment member to each other, a partition member that partitions a liquid chamber within the first attachment member into a main liquid chamber having the elastic body as a portion of a barrier wall, and an auxiliary liquid chamber, has been known from the past.

In the vibration-damping device, the partition member is provided with a membrane that forms a portion of a barrier wall of the main liquid chamber, a first communication hole that is open toward the main liquid chamber, a second communication hole that is open toward the auxiliary liquid chamber, an intermediate chamber that is located opposite to the main liquid chamber across the membrane and has the membrane as a portion of the barrier wall, a first restriction passage that allows the first communication hole and the second communication hole to communicate with each other, and a second restriction passage that allows the intermediate chamber and the second communication hole to communicate with each other.

Then, when a vibration having a minute amplitude is input to the vibration-damping device, the membrane is elastically deformed. Accordingly, the dynamic spring constant is suppressed to be low, and when a vibration having an amplitude larger than the minute amplitude and the same frequency is input, the first attachment member and the second attachment member are relatively displaced while elastically deforming the elastic body, and the internal pressure of the main liquid chamber is fluctuated to make the liquid flow through the first restriction passage, for example. Accordingly, this vibration is damped and absorbed.

CITATION LIST

Patent Document

[Patent Document 1]
  PCT International Publication No. WO2018/051627

SUMMARY OF INVENTION

Technical Problem

Meanwhile, in the vibration-damping device having the above configuration, in a case where the vibration having the same frequency is input, if the amplitude of the input vibration increases or decreases in a range of an amplitude larger than the minute amplitude, it is difficult to absorb and damp the input vibration correspondingly.

The present invention has been made in consideration of such circumstances, and an object thereof is to provide a vibration-damping device in which the dynamic spring constant during the input of minute amplitude vibration can be suppressed, and at the same time, if the frequency of input vibration is the same, even if the amplitude of the input vibration increases or decreases in a range of an amplitude larger than the minute amplitude, the input vibration can be damped and absorbed correspondingly.

Solution to Problem

A vibration-damping device of the present invention includes a tubular first attachment member configured to be connected to any one of a vibration generating part and a vibration receiving part, and a second attachment member configured to be connected to the other thereof; an elastic body configured to connect the first attachment member and the second attachment member to each other; and a partition member configured to partition a liquid chamber in the first attachment member into a main liquid chamber having the elastic body as a portion of a barrier wall thereof, and an auxiliary liquid chamber, the partition member includes a membrane that forms part of the barrier wall of the main liquid chamber and is elastically deformably provided, and an orifice that allows the main liquid chamber and the auxiliary liquid chamber to communicate with each other, the orifice includes a first communication hole that is open toward the main liquid chamber, a second communication hole that is open toward the auxiliary liquid chamber, an intermediate chamber that is located opposite to the main liquid chamber across the membrane and has the membrane as a portion of the barrier wall, a restriction passage that extends in a circumferential direction, and a communication hole that allows the intermediate chamber and the restriction passage to communicate with each other, the restriction passage includes a main liquid chamber-side passage that is located on the main liquid chamber side, and an auxiliary liquid chamber-side passage that extends from the main liquid chamber-side passage toward an auxiliary liquid chamber side, the main liquid chamber-side passage and the auxiliary liquid chamber-side passage extend in the circumferential direction and are disposed to be connected to each other in a radial direction, and when a liquid flows through the restriction passage from any one of the first communication hole and the second communication hole toward the other, the flow direction in the main liquid chamber-side passage and the flow direction in the auxiliary liquid chamber-side passage are opposite to each other.

Advantageous Effects of Invention

According to the present invention, the dynamic spring constant during the input of the minute amplitude vibration can be suppressed, and at the same time, if the frequency of the input vibration is the same, even if the amplitude of the input vibration increases or decreases in a range of an amplitude larger than the minute amplitude, the input vibration can be damped and absorbed correspondingly.

DESCRIPTION OF EMBODIMENTS

Figure 1:
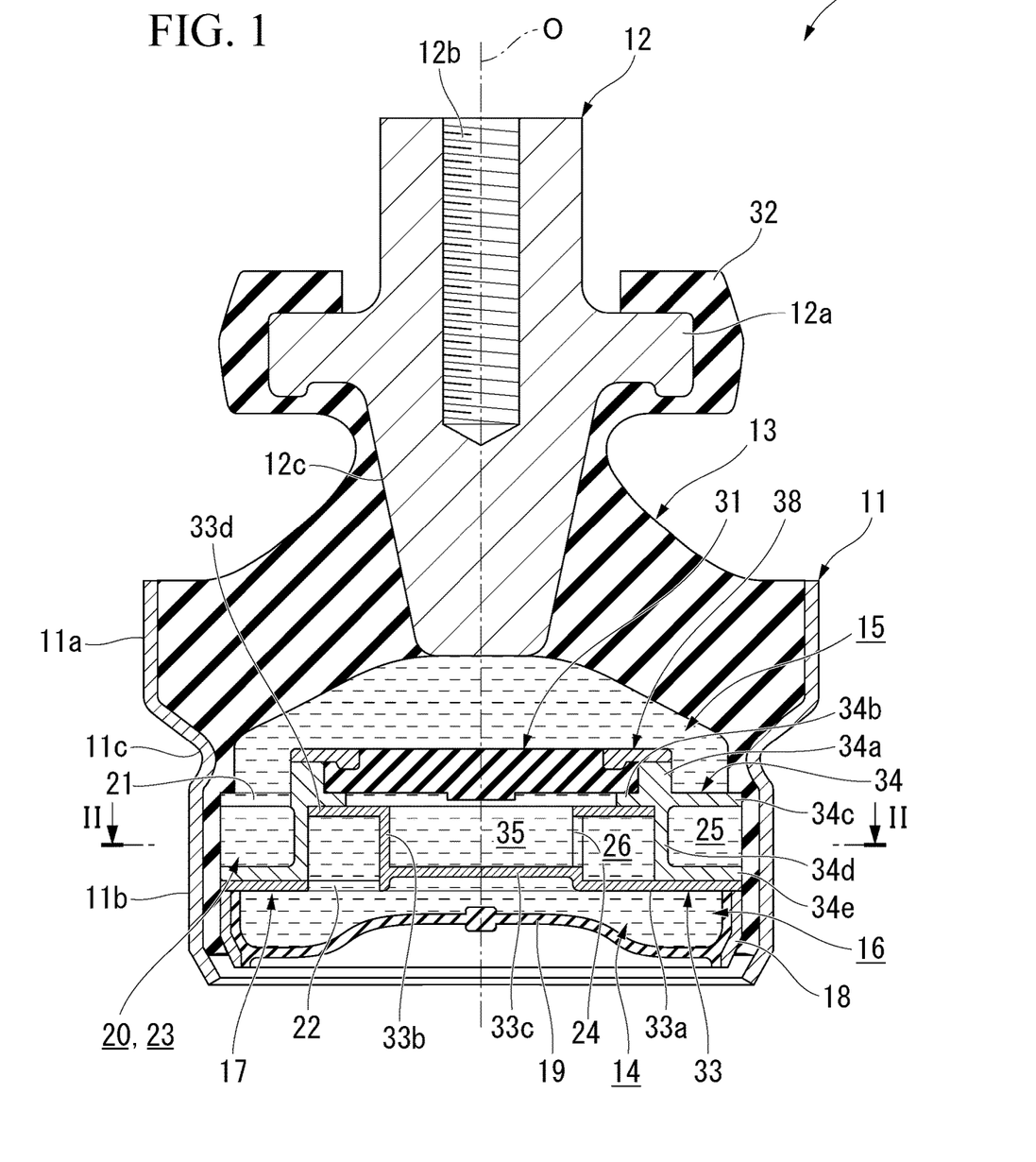
FIG. 1 is a longitudinal sectional view of a vibration-damping device according to a first embodiment of the present invention.

Hereinafter, a vibration-damping device according to a first embodiment of the present invention will be described, referring to FIGS. 1 and 2.

A vibration-damping device 1 includes a tubular first attachment member 11 that is connected to any one of a vibration generating part and a vibration receiving part, a second attachment member 12 that is connected to the other thereof, an elastic body 13 that connects the first attachment member 11 and the second attachment member 12 to each other, and a partition member 17 that partitions a liquid chamber 14 within the first attachment member 11 into a main liquid chamber 15 having the elastic body 13 as a portion of a barrier wall thereof, and an auxiliary liquid chamber 16.

In a case where the vibration-damping device 1 is used, for example, as an engine mount of an automobile, the first attachment member 11 is connected to a vehicle body serving as the vibration receiving part, and the second attachment member 12 is connected to an engine serving as the vibration generating part. Accordingly, the transmission of the vibration of the engine to the vehicle body is suppressed.

In the shown example, the partition member 17 partitions the liquid chamber 14 into the main liquid chamber 15 and the auxiliary liquid chamber 16 in an axial direction along a central axis O of the first attachment member 11.

Hereinafter, the main liquid chamber 15 side in the axial direction with respect to the partition member 17 is defined as an upper side, and the auxiliary liquid chamber 16 side is defined as a lower side. Viewing the vibration-damping device 1 from the axial direction, a direction intersecting the central axis O is defined as a radial direction, and a direction going around the central axis O is defined as a circumferential direction.

The first attachment member 11 includes an upper tubular portion 11a located on the upper side, a lower tubular portion 11b having an inner diameter and an outer diameter smaller than those of the upper tubular portion 11a and located on the lower side, and a constriction portion 11c that connects the upper tubular portion 11a and the lower tubular portion 11b to each other and continuously extends over the entire circumference. An inner peripheral surface of the lower tubular portion 11b is covered with a covering rubber. The covering rubber is formed integrally with the elastic body 13.

The second attachment member 12 is formed in a rod shape and is disposed coaxially with the central axis O. The second attachment member 12 is disposed radially inside the first attachment member 11. A flange portion 12a projecting radially outward is formed at an intermediate portion in the axial direction of the second attachment member 12. A female screw portion 12b is formed on an upper end surface of the second attachment member 12. A tapered portion 12c of which the diameter is reduced toward the lower side is formed in a portion of the second attachment member 12 located below the flange portion 12a. The flange portion 12a is located above the first attachment member 11. A lower end portion of the second attachment member 12 is located below an upper end opening edge of the first attachment member 11.

The elastic body 13 is formed in an annular shape and is disposed coaxially with the central axis O. The elastic body 13 connects the upper tubular portion 11a of the first attachment member 11 and the tapered portion 12c of the second attachment member 12 to each other. An outer peripheral side of the elastic body 13 is integrally vulcanized and bonded to the respective inner peripheral surfaces of the upper tubular portion 11a and the constriction portion 11c in the first attachment member 11. An inner peripheral side of the elastic body 13 is vulcanized and bonded to the tapered portion 12c of the second attachment member 12. The elastic body 13 extends upward from the outer side toward the inner side in the radial direction. An upper end opening portion of the first attachment member 11 is sealed with the elastic body 13.

The elastic body 13 is formed integrally with a stopper rubber 32 that integrally covers an upper surface, a lower surface, and an outer peripheral surface of the flange portion 12a of the second attachment member 12.

A tubular diaphragm ring 18 is liquid-tightly fitted into a lower end portion of the first attachment member 11 via the covering rubber. An outer peripheral portion of the diaphragm 19, which is elastically deformably formed from a rubber material or the like, is vulcanized and bonded to an inner peripheral surface of the diaphragm ring 18. The diaphragm ring 18 is fixed to the first attachment member 11 by crimping a lower end portion of the first attachment member 11 radially inward. The diaphragm 19 seals a lower end opening portion of the first attachment member 11.

The liquid chamber 14 in which a liquid is enclosed is defined within the first attachment member 11 by the diaphragm 19 and the elastic body 13. Examples of the liquid enclosed in the liquid chamber 14 include ethylene glycol, water, and silicone oil.

The partition member 17 is formed in a flat disk shape. The partition member 17 is disposed coaxially with the central axis O. The partition member 17 is fitted in the first attachment member 11. The partition member 17 is sandwiched in the axial direction by the constriction portion 11c of the first attachment member 11 and the diaphragm ring 18. The liquid chamber 14 within the first attachment member 11 is partitioned into the main liquid chamber 15 defined by the elastic body 13 and the partition member 17 and the auxiliary liquid chamber 16 defined by the diaphragm 19 and the partition member 17 by the partition member 17. The diaphragm 19 is deformed to expand and contract with the inflow and outflow of a liquid into the auxiliary liquid chamber 16.

The partition member 17 includes a membrane 31, which forms a portion of the barrier wall of the main liquid chamber 15 and which is provided so as to be elastically deformable, an orifice 20 that allows the main liquid chamber 15 and the auxiliary liquid chamber 16 to communicate with each other, an upper member 34 that surrounds the membrane 31 from the outer side in the radial direction, a lower member 33 that is fitted in the upper member 34, and an annular fixing member 38 that fixes the membrane 31 to the upper member 34.

The partition member 17 may not have at least one of the upper member 34, the lower member 33, and the fixing member 38, and the upper member 34, the lower member 33, and the fixing member 38 may be integrally formed.

The membrane 31 is elastically deformably formed from a rubber material or the like. The membrane 31 is formed in a plate shape. The membrane 31 has, for example, a circular shape when viewed from the axial direction. In addition, the membrane 31 may have, for example, a rectangular shape or the like when viewed from the axial direction. The membrane 31 is disposed coaxially with the central axis O. The membrane 31 is not formed with a through-hole that penetrates in the axial direction. The membrane 31 is provided so as not to collide with other members provided in the liquid chamber 14 during elastic deformation associated with the input of vibration.

The upper member 34 includes a fixed tubular portion 34a that surrounds the membrane 31 from the outer side in the radial direction, an annular fixing flange 34b that projects radially inward from a lower end opening edge of the fixed tubular portion 34a, an annular upper flange 34c that projects radially outward from a lower end opening edge of the fixed tubular portion 34a, an outer tubular portion 34d that projects downward from the fixed tubular portion 34a, and a lower flange 34e that projects radially outward from a lower end opening edge of the outer tubular portion 34d.

The fixed tubular portion 34a, the fixing flange 34b, the upper flange 34c, the outer tubular portion 34d, and the lower flange 34e are disposed coaxially with the central axis O.

The respective outer peripheral edges of the upper flange 34c and the lower flange 34e are fitted into the lower tubular portion 11b via the covering rubber. The fixing member 38 is placed on an upper end opening edge of the fixed tubular portion 34a, and the fixing member 38 is fixed to the upper member 34 by a bolt or the like (not shown). An outer peripheral edge portion of the membrane 31 is sandwiched and fixed in the axial direction by the fixing member 38 and the fixing flange 34b. Accordingly, the membrane 31 is elastically deformed in the axial direction with the outer peripheral edge portion as a fixed end as the internal pressure of the main liquid chamber 15 fluctuates.

The lower member 33 is fitted in the outer tubular portion 34d of the upper member 34. The lower member 33 includes an annular bottom plate portion 33a, an inner tubular portion 33b that projects upward from an inner peripheral edge of the bottom plate portion 33a, a first blocking portion (partition wall) 33c that blocks the inside of a lower end portion of the inner tubular portion 33b, and an annular upper plate portion 33d that projects radially outward from an upper end opening edge of the inner tubular portion 33b.

The bottom plate portion 33a, the inner tubular portion 33b, the first blocking portion 33c, and the upper plate portion 33d are disposed coaxially with the central axis O.

An outer peripheral edge of the bottom plate portion 33a is fitted into the lower tubular portion 11b via the covering rubber. An outer peripheral portion of an upper surface of the bottom plate portion 33a abuts against the lower flange 34e of the upper member 34, and an inner peripheral portion thereof is located radially inside the lower flange 34e and the outer tubular portion 34d. The inner tubular portion 33b is disposed radially inside the outer tubular portion 34d. The first blocking portion 33c is located above the bottom plate portion 33a. An outer peripheral edge of the upper plate portion 33d is fitted in the outer tubular portion 34d. An upper surface of the upper plate portion 33d abuts against a lower surface of the fixing flange 34b.

The orifice 20 includes a first communication hole 21 that is open toward the main liquid chamber 15, a second communication hole 22 that is open toward the auxiliary liquid chamber 16, an intermediate chamber 35 that is located opposite to the main liquid chamber 15 across the membrane 31 and has the membrane 31 as a portion of the barrier wall, a restriction passage 23 that extends in the circumferential direction, and a communication hole 24 that allows the intermediate chamber 35 and the restriction passage 23 to communicates with each other.

The first communication hole 21 is formed in the upper flange 34c of the upper member 34.

The second communication hole 22 is formed in an inner peripheral portion of the bottom plate portion 33a of the lower member 33. The second communication hole 22 is located radially inside the first communication hole 21. The circumferential positions of the second communication hole 22 and the first communication hole 21 are equal to each other. The first communication hole 21 and the second communication hole 22 are adjacent to each other in the radial direction when viewed from the axial direction.

The intermediate chamber 35 is defined by the inner tubular portion 33b and the first blocking portion 33c of the lower member 33, and the membrane 31. The intermediate chamber 35 has a circular shape when viewed from the axial direction. The intermediate chamber 35 is disposed coaxially with the central axis O. The first blocking portion 33c partitions the intermediate chamber 35 and the auxiliary liquid chamber 16 in the axial direction.

The restriction passage 23 includes a main liquid chamber-side passage 25 located on the main liquid chamber 15 side, and an auxiliary liquid chamber-side passage 26 that extends from the main liquid chamber-side passage 25 toward the auxiliary liquid chamber 16 side. The main liquid chamber-side passage 25 and the auxiliary liquid chamber-side passage 26 extend in the circumferential direction and are disposed so as to be connected to each other in the radial direction, and when the liquid flows through the restriction passage 23 from any one of the first communication hole 21 and the second communication hole 22 toward the other side, the flow direction in the main liquid chamber-side passage 25 and the flow direction in the auxiliary liquid chamber-side passage 26 are opposite to each other.

The main liquid chamber-side passage 25 is defined by the upper flange 34c, the outer tubular portion 34d, and the lower flange 34e in the upper member 34, and the covering rubber on the inner peripheral surface of the lower tubular portion 11b. The main liquid chamber-side passage 25 is provided about the central axis O over an angular range larger than 180° and smaller than 360°. In addition, the angular range may be 180° or less or 360° or more.

Figure 2:
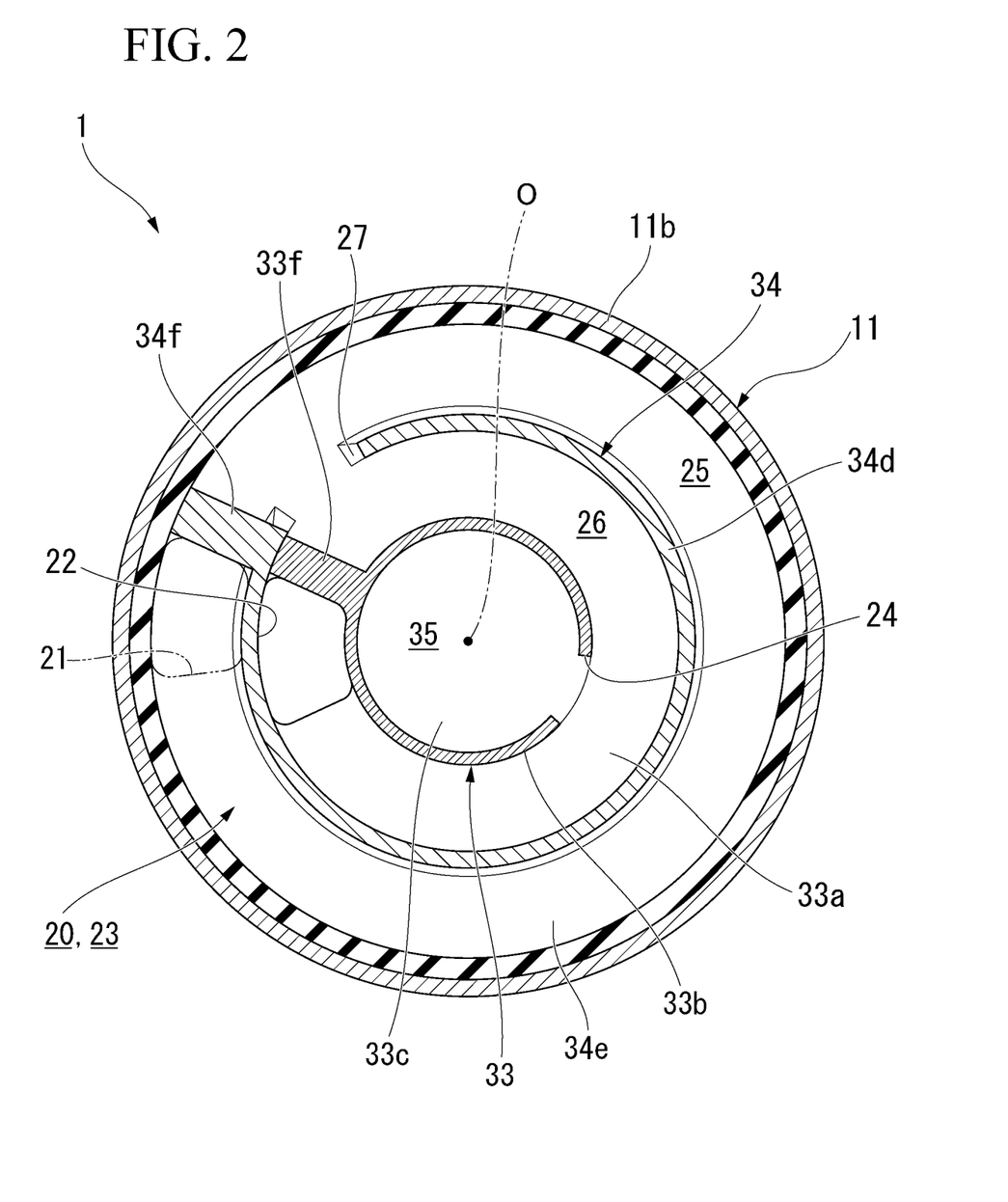
FIG. 2 is a cross-sectional view taken along line 11-11 of the vibration-damping device of FIG. 1.

Here, as shown in FIG. 2, the upper member 34 includes an outer barrier wall 34f that projects radially outward from the outer tubular portion 34d and the outer peripheral edge is fitted to the covering rubber on the inner peripheral surface of the lower tubular portion 11b. The outer barrier wall 34f defines both end portions of the main liquid chamber-side passage 25 in the circumferential direction.

A first end portion of the main liquid chamber-side passage 25 in the circumferential direction faces the first communication hole 21 of the upper flange 34c in the axial direction. The first end portion of the main liquid chamber-side passage 25 in the circumferential direction communicates with the main liquid chamber 15 through the first communication hole 21.

A connection hole 27 that penetrates in the radial direction is formed in a portion of the outer tubular portion 34d that sandwiches the outer barrier wall 34f in the circumferential direction and is located opposite to the first communication hole 21, when viewed from the axial direction. The connection hole 27 and the first communication hole 21 are adjacent to the outer barrier wall 34f in the circumferential direction when viewed from the axial direction. The connection hole 27 is open to an inner peripheral surface, which is located on the inner side in the radial direction and faces the outer side in the radial direction, on an inner surface defining a second end portion of the main liquid chamber-side passage 25 in the circumferential direction. The connection hole 27 allows the second end portion of the main liquid chamber-side passage 25 in the circumferential direction and the auxiliary liquid chamber-side passage 26 in the radial direction to communicate with each other.

The auxiliary liquid chamber-side passage 26 is provided radially inside the main liquid chamber-side passage 25. The auxiliary liquid chamber-side passage 26 is defined by the inner peripheral portion of the bottom plate portion 33a, an inner tubular portion 33b, an upper plate portion 33d in the lower member 33, and the outer tubular portion 34d of the upper member 34. The auxiliary liquid chamber-side passage 26 surrounds the intermediate chamber 35 defined by the inner tubular portion 33b, the first blocking portion 33c, and the membrane 31 in the lower member 33 from the outer side in the radial direction, and the intermediate chamber 35 is provided in a portion of the partition member 17 located radially inside the restriction passage 23.

The auxiliary liquid chamber-side passage 26 is provided about the central axis O over an angular range larger than 180° and smaller than 360°. In addition, the angular range may be 180° or less or 360° or more. The angular ranges of the auxiliary liquid chamber-side passage 26 and the main liquid chamber-side passage 25 are equal to each other. In addition, the angular ranges of the auxiliary liquid chamber-side passage 26 and the main liquid chamber-side passage 25 may be different from each other.

Here, as shown in FIG. 2, the lower member 33 includes an inner barrier wall 33f that projects radially outward from the inner tubular portion 33b and has an outer peripheral edge fitted in the outer tubular portion 34d of the upper member 34. The inner barrier wall 33f defines both end portions of the auxiliary liquid chamber-side passage 26 in the circumferential direction. The circumferential positions of the inner barrier wall 33f and the outer barrier wall 34f are equal to each other. The inner barrier wall 33f and the outer barrier wall 34f are provided so as to be connected to each other in the radial direction. The circumferential positions of the auxiliary liquid chamber-side passage 26 and the main liquid chamber-side passage 25 are equal to each other over the entire length in the circumferential direction. In addition, the circumferential positions of the auxiliary liquid chamber-side passage 26 and the main liquid chamber-side passage 25 may be different from each other.

A first end portion of the auxiliary liquid chamber-side passage 26 in the circumferential direction faces the connection hole 27 of the outer tubular portion 34d in the radial direction. The first end portion of the auxiliary liquid chamber-side passage 26 in the circumferential direction communicates with the main liquid chamber-side passage 25 through the connection hole 27.

A second end portion of the auxiliary liquid chamber-side passage 26 in the circumferential direction faces the second communication hole 22 of the bottom plate portion 33a in the axial direction. The second end portion of the auxiliary liquid chamber-side passage 26 in the circumferential direction communicates with the auxiliary liquid chamber 16 through the second communication hole 22. The second communication hole 22 and the connection hole 27 are adjacent to the inner barrier wall 33f in the circumferential direction when viewed from the axial direction.

The communication hole 24 that penetrates in the radial direction is formed in a portion of the inner tubular portion 33b that faces the inner barrier wall 33f in the radial direction across the central axis O. The communication hole 24 allows the intermediate chamber 35 and the restriction passage 23 to communicate with each other. An intermediate portion of the auxiliary liquid chamber-side passage 26 in the circumferential direction communicates with the intermediate chamber 35 through the communication hole 24. The communication hole 24 is open to an inner peripheral surface, which is located on the inner side in the radial direction and faces the outer side in the radial direction, on an inner surface of the auxiliary liquid chamber-side passage 26.

The flow resistances of the main liquid chamber-side passage 25 and the auxiliary liquid chamber-side passage 26 are equal to each other. The flow passage length of the main liquid chamber-side passage 25 is longer than the flow passage length of the auxiliary liquid chamber-side passage 26, and the flow passage cross-sectional area of the main liquid chamber-side passage 25 is larger than the flow passage cross-sectional area of the auxiliary liquid chamber-side passage 26. The flow resistance of each of the main liquid chamber-side passage 25 and the auxiliary liquid chamber-side passage 26 is tuned such that the resonance frequency of each of the passages 25 and 26 is, for example, the frequency of shake vibration or the like.

In addition, the flow resistance of each of the main liquid chamber-side passage 25 and the auxiliary liquid chamber-side passage 26 may be different from each other.

Next, the operation of the vibration-damping device 1 configured as described above will be described.

When vibration is input to the vibration-damping device 1 and the first attachment member 11 and the second attachment member 12 are relatively displaced, the elastic body 13 connecting the first attachment member 11 and the second attachment member 12 to each other is elastically deformed. In this case, the internal pressure of the main liquid chamber 15 fluctuates, and the liquid flows back and forth between the main liquid chamber 15 and the auxiliary liquid chamber 16 through the first communication hole 21, the main liquid chamber-side passage 25, the connection hole 27, the auxiliary liquid chamber-side passage 26, and the second communication hole 22, and liquid column resonance occurs in the restriction passage 23 to damp and absorb the vibration. Additionally, when the internal pressure of the main liquid chamber 15 fluctuates, the membrane 31 is elastically deformed in the axial direction with the outer peripheral edge portion as a fixed end, and the liquid flows in and out of the intermediate chamber 35 through the communication hole 24, so that the dynamic spring constant is suppressed.

As described above, according to the vibration-damping device 1 according to the present embodiment, when the liquid flows through the restriction passage 23 from any one of the first communication hole 21 and the second communication hole 22 toward the other, the flow direction in the main liquid chamber-side passage 25 and the flow direction in the auxiliary liquid chamber-side passage 26 are opposite to each other. Thus, for example, as compared to a case where the main liquid chamber-side passage 25 and the auxiliary liquid chamber-side passage 26 are directly connected to each other in the circumferential direction and the flow directions therein are the same, the flow resistance of the liquid can be easily increased or decreased in conformity with the increase or decrease in the amplitude of the input vibration, that is, the increase or decrease in the flow velocity of the liquid flowing through the restriction passage 23.

Accordingly, the dynamic spring constant during the input of minute amplitude (for example, 0.05 mm to 0.2 mm) vibration is suppressed, and at the same time, if the frequency of the input vibration is the same, even if the amplitude of the input vibration increases or decreases in an amplitude range larger than the minute amplitude (for example, 0.2 mm to 1.0 mm), correspondingly, the liquid column resonance can be generated in the restriction passage 23, and the input vibration can be damped and absorbed.

The orifice 20 that allows the main liquid chamber 15 and the auxiliary liquid chamber 16 to communicate with each other has the intermediate chamber 35 having the membrane 31 as a portion of the barrier wall and the communication hole 24 that allows the intermediate chamber 35 and the restriction passage 23 to communicate with each other. Accordingly, during the vibration input, the membrane 31 can be elastically deformed while the liquid flows in and out of the intermediate chamber 35 through the communication hole 24, and the dynamic spring constant can be suppressed to be low.

The membrane 31 is elastically deformably provided so as to form a portion of the barrier wall of each of the main liquid chamber 15 and the intermediate chamber 35, and there is, for example, no so-called rattling membrane in which a membrane is movably accommodated into an accommodation chamber communicating with both the main liquid chamber 15 and the intermediate chamber 35. Thus, during the vibration input, it is possible to prevent the membrane 31 from colliding with other members and producing a striking sound.

Since the main liquid chamber-side passage 25 and the auxiliary liquid chamber-side passage 26 extend in the circumferential direction and are disposed so as to be connected to each other in the radial direction, it is possible to suppress the bulkiness of the vibration-damping device 1 in the axial direction.

The orifice 20 includes the first communication hole 21, the second communication hole 22, the intermediate chamber 35, the restriction passage 23, and the communication hole 24. Thus, when a vibration having a large amplitude is input, the liquid that has flowed into the orifice 20 through any one of the first communication hole 21 and the second communication hole 22 passes through the communication hole 24. Accordingly, for example, the liquid can be branched to the intermediate chamber 35 and the restriction passage 23, or the flow direction of the liquid can be changed.

Accordingly, it is possible to suppress the flow velocity and flow rate of the liquid flowing out from any other of the first communication hole 21 and the second communication hole 22 when a vibration having a large amplitude is input, bubbles are less likely to be generated at the main liquid chamber 15, and the generation of abnormal noise caused by the collapse of bubbles in the main liquid chamber 15 can be suppressed.

Since the intermediate chamber 35 is provided in a portion of the partition member 17 located radially inside the restriction passage 23, it is possible to efficiently dispose the intermediate chamber 35 and the restriction passage 23, and a situation in which the partition member 17 becomes excessively large can be prevented.

Both end portions of the main liquid chamber-side passage 25 in the circumferential direction communicate with the first communication hole 21 and the connection hole 27 separately, and both end portions of the auxiliary liquid chamber-side passage 26 in the circumferential direction communicate with the connection hole 27 and the second communication hole 22 separately. Thus, it is possible to secure the flow passage length of the restriction passage 23, and the resonance frequency or the like of the restriction passage 23 can be easily tuned.

Figure 3:
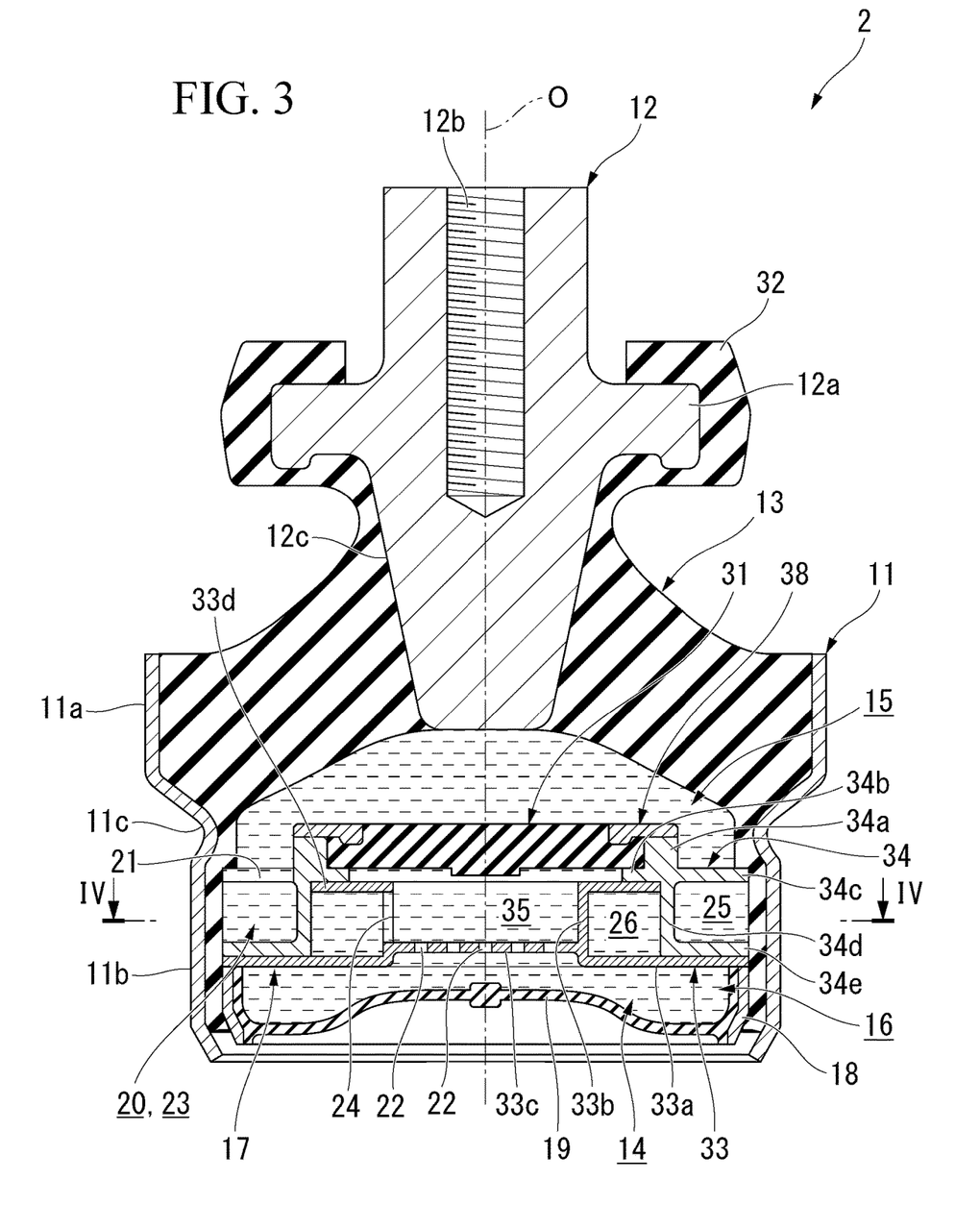
FIG. 3 is a longitudinal sectional view of a vibration-damping device according to a second embodiment of the present invention.
Figure 4:
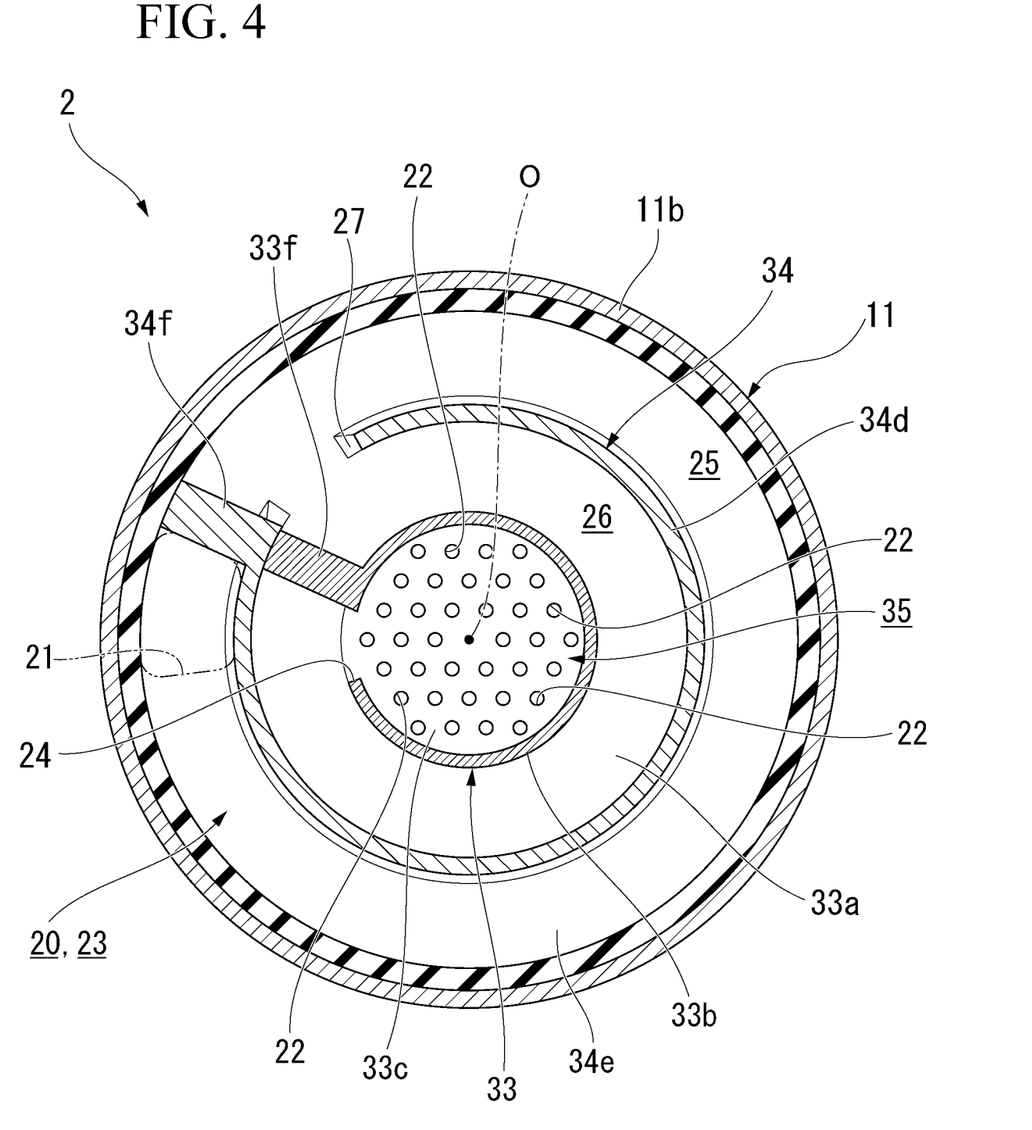
FIG. 4 is a cross-sectional view taken along line IV-IV of the vibration-damping device of FIG. 3.

Next, a vibration-damping device 2 related to a second embodiment of the present invention will be described, referring to FIGS. 3 and 4.

In addition, in the second embodiment, the same portions as the constituent elements in the above-described first embodiment will be designated by the same reference numerals, and a description thereof will be omitted, and only different points will be described.

In the present embodiment, the second communication hole 22 of the orifice 20 that is open toward the auxiliary liquid chamber 16 penetrates the first blocking portion 33c of the partition member 17 in the axial direction. A plurality of the second communication holes 22 are formed in the first blocking portion 33c. The flow passage lengths of the plurality of second communication holes 22 are equal to each other. The inner diameter of each second communication hole 22 is the same over the entire length. The total sum of the respective flow passage cross-sectional areas of the plurality of second communication holes 22 is smaller than the minimum value of the flow passage cross-sectional area of the restriction passage 23.

The communication hole 24 that allows the intermediate chamber 35 and the restriction passage 23 to communicate with each other is formed in a portion of the inner tubular portion 33b that sandwiches the inner barrier wall 33f in the circumferential direction and is located opposite to the connection hole 27, when viewed from the axial direction. The communication hole 24 and the connection hole 27 are adjacent to the inner barrier wall 33f in the circumferential direction when viewed from the axial direction. The second end portion of the auxiliary liquid chamber-side passage 26 in the circumferential direction communicates with the intermediate chamber 35 through the communication hole 24.

As described above, according to the vibration-damping device 2 according to the present embodiment, the second communication hole 22 is a through-hole formed in the first blocking portion 33c that partitions the intermediate chamber 35 and the auxiliary liquid chamber 16 from each other. Thus, when the membrane 31 is elastically deformed during the vibration input, the liquid flows back and forth between the intermediate chamber 35 and the auxiliary liquid chamber 16 through the second communication hole 22, the dynamic spring constant can be reliably suppressed, and for example, idle vibration, muffled sound, or the like having a relatively high frequency can be damped and absorbed.

In addition, the technical scope of the present invention is not limited to the above embodiment, and various changes can be made without departing from the scope of the present invention.

The auxiliary liquid chamber-side passage 26 may be provided radially outside the main liquid chamber-side passage 25.

The intermediate chamber 35 may be provided in a portion of the partition member 17 located radially outside the restriction passage 23.

The above embodiment shows a configuration in which both end portions of the main liquid chamber-side passage 25 in the circumferential direction communicate with the first communication hole 21 and the connection hole 27 separately and both end portions of the auxiliary liquid chamber-side passage 26 in the circumferential direction communicate with the connection hole 27 and the second communication hole 22 separately. However, an intermediate portion of the main liquid chamber-side passage 25 in the circumferential direction communicates with at least one of the first communication hole 21 and the connection hole 27, and an intermediate portion of the auxiliary liquid chamber-side passage 26 in the circumferential direction may communicate with at least one of the connection hole 27 and the second communication hole 22.

In the above embodiments, the compression type vibration-damping devices 1 and 2 in which the positive pressure acts on the main liquid chamber 15 as the support load acts have been described. However, it is also applicable to a hanging-type vibration-damping device that is attached such that the main liquid chamber 15 is located on the lower side in a vertical direction and the auxiliary liquid chamber 16 is located on the upper side in the vertical direction and the negative pressure acts on the main liquid chamber 15 as the support load acts.

The vibration-damping devices 1 and 2 according to the present invention are not limited to engine mounts of vehicles and are also applicable to those other than the engine mounts. For example, the vibration-damping devices are also applicable to vehicle cabin mounts or bushes or to mounts of power generators loaded on construction machines or are also applicable to mounts of machines installed in factories or the like.

In addition, it is possible to appropriately replace the constituent elements in the above-described embodiment with well-known constituent elements without departing from the scope of the present invention, and the above-described embodiment and modification examples may be appropriately combined.

According to the vibration-damping device according to the present invention, when the liquid flows through the restriction passage from any one of the first communication hole and the second communication hole toward the other, the flow direction in the main liquid chamber-side passage and the flow direction in the auxiliary liquid chamber-side passage are opposite to each other. Thus, for example, as compared to a case where the main liquid chamber-side passage and the auxiliary liquid chamber-side passage are directly connected to each other in the circumferential direction and the flow directions thereof are the same, the flow resistance of the liquid can be easily increased or decreased in conformity with the increase or decrease in the amplitude of the input vibration, that is, the increase or decrease in the flow velocity of the liquid flowing through the restriction passage. Accordingly, the dynamic spring constant during the input of the minute amplitude vibration can be suppressed, and at the same time, if the frequency of the input vibration is the same, even if the amplitude of the input vibration increases or decreases in a range of an amplitude larger than the minute amplitude, correspondingly, the liquid column resonance can be generated in the restriction passage, and the input vibration can be damped and absorbed.

The orifice that allows the main liquid chamber and the auxiliary liquid chamber to communicate with each other has the intermediate chamber having the membrane as a portion of the barrier wall and the communication hole that allows the intermediate chamber and the restriction passage to communicate with each other. During the vibration input, the membrane can be elastically deformed while the liquid flows in and out of the intermediate chamber through the communication hole, and the dynamic spring constant can be suppressed to be low.

The membrane is elastically deformably provided so as to form a portion of the barrier wall of each of the main liquid chamber and the intermediate chamber, and there is, for example, no so-called rattling membrane in which a membrane is movably accommodated into an accommodation chamber communicating with both the main liquid chamber and the intermediate chamber. Thus, during the vibration input, it is possible to prevent the membrane from colliding with other members and producing a striking sound.

Since the main liquid chamber-side passage and the auxiliary liquid chamber-side passage extend in the circumferential direction and are disposed so as to be connected to each other in the radial direction, it is possible to suppress the bulkiness of the vibration-damping device in the axial direction.

The orifice includes the first communication hole, the second communication hole, the intermediate chamber, the restriction passage, and the communication hole. Thus, when a vibration having a large amplitude is input, the liquid that has flowed into the orifice through any one of the first communication hole and the second communication holes passes through the communication hole. Accordingly, for example, the liquid can be branched to the intermediate chamber and the restriction passage, or the flow direction of the liquid can be changed. Accordingly, it is possible to suppress the flow velocity and flow rate of the liquid flowing out from any other of the first communication hole and the second communication hole when a vibration having a large amplitude is input, bubbles are less likely to be generated at the main liquid chamber, and the generation of abnormal noise caused by the collapse of bubbles in the main liquid chamber can be suppressed.

Here, the intermediate chamber may be provided in a portion of the partition member located radially inside the restriction passage.

In this case, since the intermediate chamber is provided in a portion of the partition member located radially inside the restriction passage, it is possible to efficiently dispose the intermediate chamber and the restriction passage, and a situation in which the partition member becomes excessively large can be prevented.

Additionally, the partition member may include the partition wall that partitions the intermediate chamber and the auxiliary liquid chamber from each other, and the second communication hole may penetrate the partition wall.

In this case, the second communication hole is a through-hole formed in the partition wall that partitions the intermediate chamber and the auxiliary liquid chamber from each other. Thus, when the membrane is elastically deformed during the vibration input, the liquid flows back and forth between the intermediate chamber and the auxiliary liquid chamber through the second communication hole, the dynamic spring constant can be reliably suppressed, and for example, idle vibration, muffled sound, or the like having a relatively high frequency can be damped and absorbed.

Additionally, a first end portion of the main liquid chamber-side passage in the circumferential direction may communicate with the main liquid chamber through the first communication hole, a second end portion of the main liquid chamber-side passage in the circumferential direction may communicate with the first end portion of the auxiliary liquid chamber-side passage in the circumferential direction via a connection hole, and the second end portion of the auxiliary liquid chamber-side passage in the circumferential direction may communicate with the auxiliary liquid chamber through the second communication hole.

In this case, both end portions of the main liquid chamber-side passage in the circumferential direction communicate with the first communication hole and the connection hole separately, and both end portions of the auxiliary liquid chamber-side passage in the circumferential direction communicate with the connection hole and the second communication hole separately. Thus, it is possible to secure the flow passage length of the restriction passage, and the resonance frequency or the like of the restriction passage can be easily tuned.

INDUSTRIAL APPLICABILITY

By applying the vibration-damping device of the present invention to the relevant field, the dynamic spring constant during the input of the minute amplitude vibration can be suppressed, and at the same time, if the frequency of the input vibration is the same, even if the amplitude of the input vibration increases or decreases in a range of an amplitude larger than the minute amplitude, the input vibration can be damped and absorbed correspondingly.

REFERENCE SIGNS LIST 1, 2: Vibration damping device
11: First attachment member
12: Second attachment member
13: Elastic body
14: Liquid chamber
15: Main liquid chamber
16: Auxiliary liquid chamber
17: Partition member
20: Orifice
21: First communication hole
22: Second communication hole
23: Restriction passage
24: Communication hole
25: Main liquid chamber-side passage
26: Auxiliary liquid chamber-side passage
27: Connection hole
31: Membrane
33c: First blocking portion (partition wall)
35: Intermediate chamber

The invention claimed is:

1. A vibration-damping device comprising:
a tubular first attachment member configured to be connected to any one of a vibration generating part and a vibration receiving part, and a second attachment member configured to be connected to the other thereof;
an elastic body configured to connect the first attachment member and the second attachment member to each other; and
a partition member configured to partition a liquid chamber in the first attachment member into a main liquid chamber having the elastic body as a portion of a barrier wall thereof, and an auxiliary liquid chamber,
wherein the partition member includes
a membrane that forms part of the barrier wall of the main liquid chamber and is elastically deformably provided, and
an orifice that allows the main liquid chamber and the auxiliary liquid chamber to communicate with each other,
the orifice includes
a first communication hole that is open toward the main liquid chamber,
at least one second communication hole that is open toward the auxiliary liquid chamber,
an intermediate chamber that is located opposite to the main liquid chamber across the membrane and has the membrane as a portion of the barrier wall,
a restriction passage that extends in a circumferential direction, and
a communication hole that allows the intermediate chamber and the restriction passage to communicate with each other,
the restriction passage includes
a main liquid chamber-side passage that is located on a main liquid chamber side, and
an auxiliary liquid chamber-side passage that extends from the main liquid chamber-side passage toward an auxiliary liquid chamber side,
the main liquid chamber-side passage and the auxiliary liquid chamber-side passage extend in the circumferential direction and are disposed to be connected to each other in a radial direction,
when a liquid flows through the restriction passage from any one of the first communication hole and the at least one second communication hole toward the other, a flow direction in the main liquid chamber-side passage and a flow direction in the auxiliary liquid chamber-side passage are opposite to each other,
the membrane is provided to be elastically deformed toward the main liquid chamber side and an intermediate chamber side, with an outer peripheral edge portion of the membrane as a fixed end, thereby a whole portion except the outer peripheral edge portion being provided to be elastically deformed toward the main liquid chamber side and the intermediate chamber side,
a first end portion of the main liquid chamber-side passage in the circumferential direction communicates with the main liquid chamber through the first communication hole,
a second end portion of the main liquid chamber-side passage in the circumferential direction communicates with the first end portion of the auxiliary liquid chamber-side passage in the circumferential direction through a connection hole,
the second end portion of the auxiliary liquid chamber-side passage in the circumferential direction communicates with the auxiliary liquid chamber through the at least one second communication hole,
the partition member includes a partition wall that partitions the intermediate chamber and the auxiliary liquid chamber from each other,
the at least one second communication hole penetrates the partition wall,
the at least one second communication hole comprises a plurality of second communication holes, and the plurality of second communication holes are formed in the partition wall, and
a total sum of respective flow passage cross-sectional areas of the plurality of second communication holes is smaller than a minimum value of a flow passage cross-sectional area of the restriction passage.

2. The vibration-damping device according to claim 1, wherein the intermediate chamber is provided in a portion of the partition member located radially inside the restriction passage.

* * * * *